United States Patent
Ogasawara

(10) Patent No.: US 11,250,586 B2
(45) Date of Patent: Feb. 15, 2022

(54) INFORMATION PROCESSING APPARATUS AND INFORMATION PROCESSING METHOD

(71) Applicant: SONY INTERACTIVE ENTERTAINMENT INC., Tokyo (JP)

(72) Inventor: Hidehiko Ogasawara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 155 days.

(21) Appl. No.: 16/615,208

(22) PCT Filed: Jun. 6, 2017

(86) PCT No.: PCT/JP2017/021012
§ 371 (c)(1),
(2) Date: Nov. 20, 2019

(87) PCT Pub. No.: WO2018/225164
PCT Pub. Date: Dec. 13, 2018

(65) Prior Publication Data
US 2020/0175715 A1 Jun. 4, 2020

(51) Int. Cl.
*G06T 7/73* (2017.01)
*G06T 7/00* (2017.01)
(Continued)

(52) U.S. Cl.
CPC ............... *G06T 7/73* (2017.01); *G06T 7/593* (2017.01); *G06T 7/97* (2017.01); *A63F 13/211* (2014.09);
(Continued)

(58) Field of Classification Search
CPC .......... G06T 2207/10012; G06T 7/593; G06T 7/73; G06T 7/97; G06T 2207/30201; G06T 7/00
See application file for complete search history.

(56) References Cited

U.S. PATENT DOCUMENTS

2009/0135183 A1* 5/2009 Sato ................. H04N 5/232
345/426
2021/0180885 A1* 6/2021 Wiedenhoefer ........... F28F 7/02

FOREIGN PATENT DOCUMENTS

EP 0999518 5/2000
JP 2009080846 A 4/2009
(Continued)

OTHER PUBLICATIONS

International Preliminary Report on Patentability dated Dec. 19, 2019, from International Application No. PCT/JP2017/021012, 17 sheets.
(Continued)

*Primary Examiner* — Bobbak Safaipour
(74) *Attorney, Agent, or Firm* — Katten Muchin Rosenman LLP

(57) ABSTRACT

A photographed image acquiring section 50 acquires data associated with a polarized image obtained through photographing of an object from an imaging apparatus 12, and stores the data in an image data storing section 52. A polarized image processing section 58 of a real space recognizing section 54 obtains distributions of degrees of polarization or normal vectors in an image plane by using the polarized image. A shadow area specifying section 60 specifies an area having peculiarity in the distribution of the degrees of polarization or the normal vectors in an image representing one surface of a subject as an area of a shadow. A state specifying section 62 acquires information associated with a state of a real object or the shadow in the real space on the basis of the area of the image of the shadow. An output data generating section 56 executes information processing by using state information in the real space, and outputs a processing result.

11 Claims, 8 Drawing Sheets

(51) Int. Cl.
*G06T 7/593* (2017.01)
*A63F 13/211* (2014.01)
*A63F 13/655* (2014.01)

(52) U.S. Cl.
CPC ....... *A63F 13/655* (2014.09); *A63F 2300/105* (2013.01); *A63F 2300/695* (2013.01); *G06T 2207/10012* (2013.01)

(56) References Cited

FOREIGN PATENT DOCUMENTS

| JP | 2012-80065 | 4/2012 |
| WO | 2009019886 A1 | 2/2009 |
| WO | 2009019887 A1 | 2/2009 |
| WO | 2009147814 A1 | 12/2009 |
| WO | 2009157129 A1 | 12/2009 |

OTHER PUBLICATIONS

Notice of Reasons of Refusal dated Aug. 11, 2020, from JP Application No. 2019-523250, 2 sheets.
International Search Report and Written Opinion dated Aug. 29, 2017, from International Application No. PCT/JP2017/021012, 9 sheets.
Gary Atkinson and Edwin R. Hancock, "Recovery of Surface Orientation from Diffuse Polarization," IEEE Transactions on Image Processing, Jun. 2006, 15(6), pp. 1653-1664.

* cited by examiner

F I G . 1
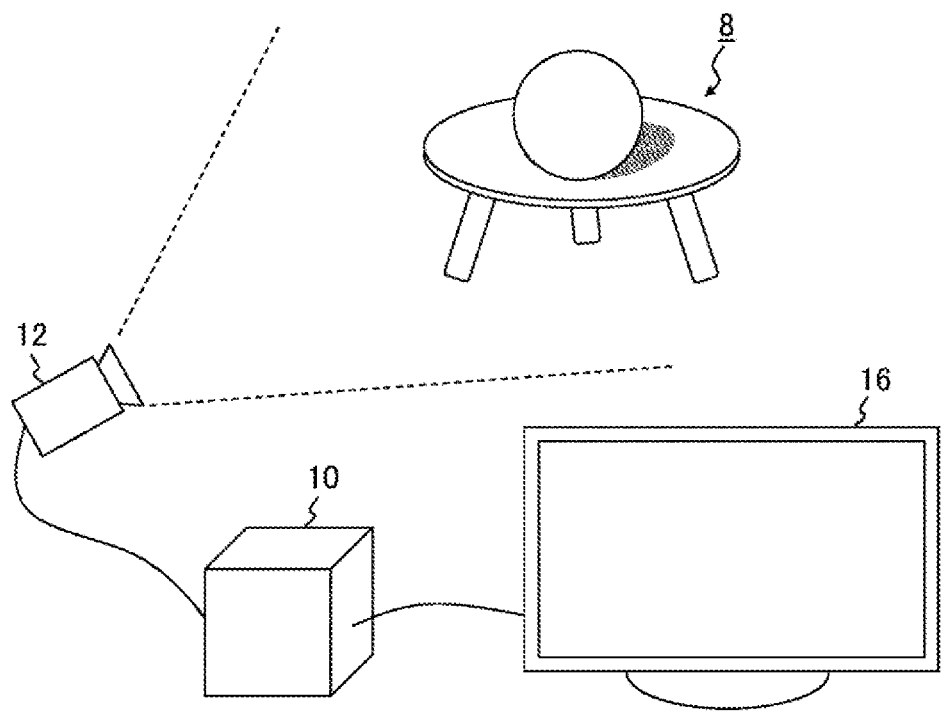
F I G . 2
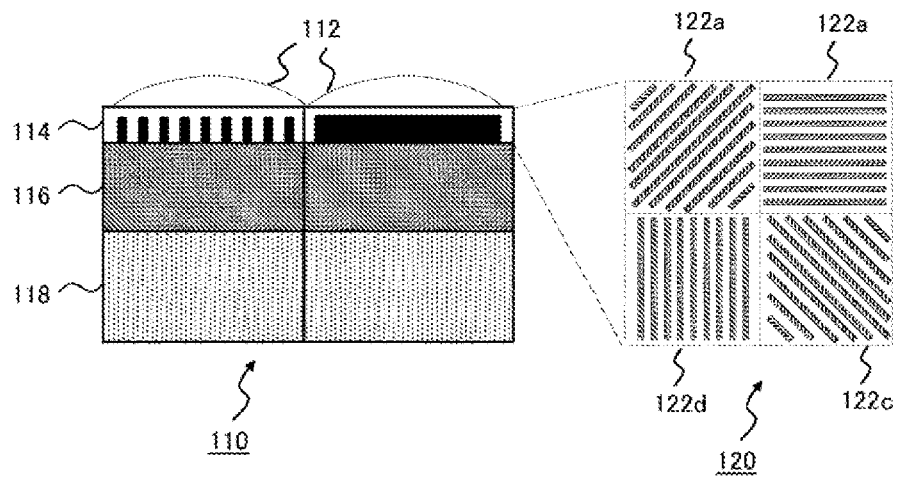

INFORMATION PROCESSING APPARATUS AND INFORMATION PROCESSING METHOD

TECHNICAL FIELD

The present invention relates to an information processing apparatus and an information processing method with each of which information processing is executed by utilizing a photographed image.

BACKGROUND ART

A game utilizing a display image is known. In this case, a part of a body such as a head of a user is photographed by using a video camera, and a predetermined area such as an eye, a mouth, or a head is extracted to be replaced with another image, thereby obtaining the display image (e.g., refer to PTL 1). In addition, there is also known a user interface system which receives a motion of a mouth or a head photographed by using a video camera as an operation instruction for an application. In such a manner, a technology with which a real world is photographed, and a virtual world responding to a motion of the real world is displayed, or such a virtual world is utilized in some sort of information processing is utilized in a wide field extending from a small mobile terminal to a leisure facility regardless of scale.

CITATION LIST

Patent Literature

[PTL 1]
European Published Patent No. 0999518

SUMMARY

Technical Problem

Image analysis acquiring a position or posture of a real object from a photographed image involves a problem that accuracy of processing is easily influenced by a circumferential situation such as other things or illuminance. For example, since an apparent color of a real object is changed, or a color, a shape, or a position of a shadow is changed depending on a position or illuminance of a light source, the real object and the shadow are difficult to distinguish in some cases. On the other hand, the information processing using the photographed image has an advantage that various events in the real world can be taken in as input data. Therefore, it is expected that the enhancement or stabilization of the accuracy of the image analysis leads to the diversification of the information processing using the result of the enhancement or stabilization.

The present invention has been made in the light of such a problem, and it is therefore desirable to provide a technology with which in an information processing technology using a photographed image, a state of a real space can be more accurately recognized. It is further desirable to provide a technology with which information processing which can be executed by using a photographed image is diversified.

Solution to Problem

A certain aspect of the present invention relates to an information processing apparatus. The information processing apparatus includes: a polarized image processing section; a shadow area specifying section; and an output data generating section. In this case, the polarized image processing section acquires distributions of degrees of polarization and normal vectors in an image plane by using a photographed polarized image. The shadow specifying section specifies an area of an image of a shadow on the basis of the distribution of the degrees of polarization or the normal vectors, the distribution being obtained for an image representing one surface of a subject. In addition, the output data generating section executes processing based on at least the area of the image of the shadow, and outputs a processing result.

Another aspect of the present invention relates to an information processing method. The information processing method includes: a step of acquiring distributions of degrees of polarization and normal vectors in an image plane by using a photographed polarized image; a step of specifying an area of an image of a shadow on the basis of the distribution of the degrees of polarization or the normal vectors, the distribution being obtained for an image representing one surface of a subject; and a step of executing processing based on at least the area of the image of the shadow, and outputting a processing result.

It should be noted that the matters obtained by transforming an arbitrary combination of the above constituent elements, and the expression of the present invention among themselves, the method, the apparatus, and the like are also valid as aspects of the present invention.

Advantageous Effects of Invention

According to the present invention, the state of the real space can be accurately recognized by using the photographed image. In addition, the information processing using the photographed image can be diversified.

BRIEF DESCRIPTION OF DRAWINGS

FIG. 1 is a view depicting an example of a configuration of an information processing system in an embodiment.

FIG. 2 is a view depicting an example of a structure of an imaging element which an imaging apparatus in the embodiment includes.

DESCRIPTION OF EMBODIMENT

Figure 3:
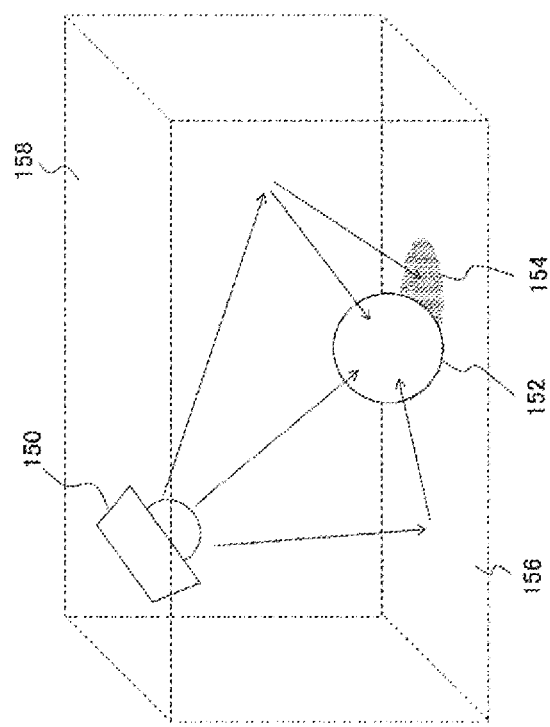
FIG. 3 is a view of assistance in explaining the principle of specifying an area of a shadow based on polarization in the embodiment.

FIG. 1 depicts an example of a configuration of an information processing system in an embodiment. The information processing system includes an imaging apparatus 12 which photographs a subject 8 at a predetermined frame rate, an information processing apparatus 10 which acquires data associated with the photographed image and executes predetermined information processing for the data, and a display apparatus 16 which outputs a result of the predetermined information processing. The information processing system may further include an input device which receives an operation for the information processing apparatus 10 from a user. The information processing system may be further communicable with an external apparatus such as a server by being connected to a network such as the Internet.

The information processing apparatus 10, the imaging apparatus 12, and the display apparatus 16 may be connected to each other via a wired cable, or may be connected to each other via a local area network (LAN) or the like in a wireless manner. In addition, any two or more apparatuses of the information processing apparatus 10, the imaging apparatus 12, and the display apparatus 16 may be combined with each other to configure an integral apparatus. For example, the information processing system may be realized by a camera, a mobile terminal and the like which are equipped with any two or more apparatuses of the information processing apparatus 10, and the imaging apparatus 12, and the display apparatus 16. Alternatively, a head-mounted display which displays an image in front of the eyes by being mounted to a head by the user may be used as the display apparatus 16, and the imaging apparatus 12 may be provided so as to photograph an image corresponding to a line of sight of the user in the head-mounted display. In any case, the appearance shapes of the information processing apparatus 10, the imaging apparatus 12, and the display apparatus 16 are by no means limited to those depicted in the figure.

After in such a system, the information processing apparatus 10 successively acquires the data associated with the image which the imaging apparatus 12 photographs at a predetermined frame rate, and the data associated with the image is analyzed to specify an image of a subject 8, the information processing apparatus 10 acquires state information such as a position or a posture in the real space. For this reason, stereo cameras which photograph the same shooting space at a known interval may be used as the imaging apparatus 12. A method of extracting a corresponding point from the stereo images photographed by using the stereo cameras and specifying a position or posture of the subject on the basis of a parallax thereof is generally known.

However, it is not the purpose that the imaging apparatus 12 is limited to the stereo cameras. In the case where the state information is acquired with respect to the object the shape of which is known, in particular, even in the case of a monocular camera, the state information can be acquired from a shape or sire of the image photographed by using the monocular camera. The information processing apparatus 10 executes the information processing so as to correspond to the state information thus acquired, generates the data associated with the display image or sound, and outputs the data thus generated to the display apparatus 16. Here, the contents of the information processing which the information processing apparatus 10 executes on the basis of the state information of the subject 8 are by no means especially limited.

For example, a predetermined object included in the subject 8 may be used as a controller for a game, and may be grasped and moved by the user to perform an operation for a game. In this case, an image representing the game world can be changed in response to a motion of the controller or the controller can cause the image replaced with a virtual object to be displayed in the photographed image on which the user is projected. Alternatively, an image representing a virtual object interacting with a hand of the user can be caused to be displayed on the head-mounted display in a field of view responding to a line of sight of the user equipped with the head-mounted display.

In such a system, it is desired to accurately and immediately specify the state information associated with the position, the posture or the like of the subject 8. However, in the case where the state information is acquired by using the photographed image, the acquisition accuracy of the information can be influenced by various factors such as the illuminance of the shooting space, the arrangement of illuminations, the numerousness of the existing things, the color, the pattern, the material or the like of the object surface, and the like. For example, when many objects exist in the shooting space, it is also considered that since not only the objects get confused, but also a certain object is reflected on the surface of other object, and the shadow is projected as if it is a part of an object, these false images are misunderstood as the real objects.

Then, in the present embodiment, in particular, the image of the shadow in the photographed image can be distinguished from the image of the real object to be recognized, thereby enhancing the accuracy of specifying the state information associated with the subject 3. In addition, by utilizing the specifying result of the image of the shadow, the presence of the real object lying in the out of the field of view of the imaging apparatus 12 is enabled to be recognized, or the position or motion itself of the shadow is enabled to be utilized as the input data. In such purposes, the imaging apparatus 12 in the present embodiment photographs at least a polarized image.

FIG. 2 depicts an example of a structure of an imaging element which the imaging apparatus 12 includes. It should be noted that the figure schematically depicts a functional structure of a cross section of an element, and a detailed structure of an interlayer insulating film, a wiring, and the like is omitted. An imaging element 110 includes a microlens layer 112, a wire grid type polarizer layer 114, a color filter layer 116, and a light detecting layer 118. The wire grid type polarizer layer 114 includes a polarizer in which a plurality of linear conductor members is arranged in stripe shape at intervals each smaller than a wavelength of incident light. When the light condensed by the microlens layer 112 is made incident to the wire grid type polarizer layer 114, a polarized component having an orientation parallel to the lines of the polarizer is reflected, and only a polarized component having an orientation vertical to the lines of the polarizer is transmitted.

The polarized component thus transmitted is detected by the light detecting layer 118, thereby acquiring the polarized image. The light detecting layer 118 has a semiconductor element structure of a general charge coupled device (CCD) image sensor, a general complementary metal oxide semiconductor (CMOS) image sensor, or the like. The wire grid type polarizer layer 114 includes arrangement of the polarizers such that angles of principal axes are different from one another in a reading unit of electric charges in the light detecting layer 118, that is, in a pixel unit or in a unit larger than the pixel unit. On the right side of the figure, the polarizer arrangement 120 when the wire grid type polarizer layer 114 is viewed from an upper surface is exemplified.

In the figure, a shaded line is a conductor (wire) constituting the polarizer. Incidentally, rectangles each indicated by a dotted line represent areas of the polarizers each having one angle of the principal axis, respectively, and the dotted lines are not actually formed. In the example depicted, the polarizers having four kinds of the angles of the principal axes are arranged in four areas 122a, 122b, 122c, and 122d of 2 row×2 column. In the figure, the polarizers lying on diagonals are orthogonal in angles of the principal axes to each other, and adjacent polarizers have a difference of 45 degrees. That is, the polarizers having four angles of the principal axes for each interval of 45 degrees are provided.

The polarizers transmit the polarized components in the direction orthogonal to the direction of the wire. As a result, in the light detecting layer 118 provided below, in areas corresponding to the four areas 122a, 122b, 122c, and 122d, the polarization information associated with the four orientations for each 45 degrees can be obtained. Such polarizers having the four angles of the principal, axes are further arranged in the longitudinal direction, and in the transverse direction by a predetermined number, and a peripheral circuit which controls a timing at which the electric charges are read out is connected to such polarizers. As a result, it is possible to realize an image sensor which can simultaneously acquire four kinds of polarization information as the two-dimensional data.

In the imaging element 110 depicted in the figure, the color filter layer 116 is provided between the wire grid type polarizer layer 114 and the light detecting layer 118. The color filter layer 116, for example, includes as arrangement of filters which transmit the red light, green light, and blue light so as to correspond to the pixels, respectively. As a result, the polarization information is obtained by color in response to a combination of the angle of the principal axis of the polarizer in the wire grid type polarizer layer 114, and the color of the filter in the color filter layer 116 provided under the wire grid type polarizer layer 114. That is, since the polarization information associated with the same orientation and the same color is discretely obtained on the image plane, the polarization information is suitably interpolated, thereby obtaining the polarized image for each orientation and for each color.

In addition, the polarized images having the same color are calculated, thereby enabling the unpolarized color image to also be reproduced. An image acquiring technology using the wire grid type polarizer, for example, is disclosed in Japanese Patent Laid-Open No. 2012-80065 or the like. However, the element structure of the imaging apparatus 12 in the present embodiment, is by no means limited to the element structure depicted in the figure. For example, since in the present embodiment, a polarized luminance image is basically used, if a color image is unnecessary for other use applications, then, the color filter layer 116 can also be omitted. In addition, the polarizer is by no means limited to the wire grid type polarizer, and any of a line dichroism polarizer and the like which are put to practical use may be used. Alternatively, a structure may be adopted in which a polarized plate changeable in angle of the principal axis is arranged in front of a general camera.

A method of obtaining a normal to the surface of a subject on the basis of a change in luminance of a polarized image with respect to a change in angle of a polarizer by utilizing the fact that a behavior for orientation of a polarized light intensity depends on a reflection angle of light from a subject is generally known (e.g., refer to Gary Atkinson and Edwin R. Hancock, "Recovery of Surface Orientation from Diffuse Polarization," IEEE Transactions on Image Processing, June 2006, 15 (6), pp. 1653-1664, Japanese Patent Laid-Open No. 2009-58533, and the like). This method can be applied to the present embodiment. Hereinafter, the outline of this method will be described.

Firstly, intensity of light which is obtained via a polarizer is changed as expressed by following Equation with respect to an angle $\theta_{pol}$ of principal axis of the polarizer.

[Math. 1]

$$I = \frac{I_{max} + I_{min}}{2} + \frac{I_{max} - I_{min}}{2}\cos(2(\theta_{pol} - \phi)) \quad \text{(Equation 1)}$$

Here, $I_{max}$ and $I_{min}$ are respectively a maximum value and a minimum value of the observed luminance, and $\phi$ is a polarization phase. In the case where as described above, the polarized images are acquired for the four kinds of angle $\theta_{pol}$ of the principal axis, a luminance I of the pixels located in the same position shall fulfill Equation 1 for the angles $\theta_{pol}$ of the principal axis. Therefore, a curved line passing through these coordinates (I, $\theta_{pol}$) is approximated to a cosine function by using the least-squares method or the like, thereby enabling $I_{max}$, $I_{min}$, and $\phi$ to be obtained. A degree ρ of polarization is obtained from following Equation by using $I_{max}$ and $I_{min}$ thus obtained.

[Math. 2]

$$\rho = \frac{I_{max} - I_{min}}{I_{max} + I_{min}} \quad \text{(Equation 2)}$$

The normal to the surface of the object can be expressed by an azimuth α representing an angle of an incident surface of light (an exit surface in the case of the diffuse reflection), and a zenith angle θ representing an angle of the surface of interest. In addition, according to a dichroism reflection model, a spectrum of reflected light is expressed by a linear sum of spectra of the specular reflection and the diffuse reflection. Here, the specular reflection is the light which is regularly reflected from a surface of an object, and the diffuse reflection is the light which is scattered by pigment particles constituting an object. The azimuth α described above is an angle of a principal, axis giving the minimum luminance $I_{min}$ in Equation 1 in the case of the specular reflection, and is an angle of a principal axis giving the maximum luminance $I_{max}$ in Equation 1 in the case of the diffuse reflection.

The zenith angle θ has following relationship with a degree $\rho_s$ of polarization in the case of the specular reflection, and a degree $\rho_d$ of polarization in the case of the diffuse reflection.

[Math. 3]

$$\rho_s = \frac{2\sin^2\theta\cos\theta\sqrt{n^2 - \sin^2\theta}}{n^2 - \sin^2\theta - n^2\sin^2\theta + 2\sin^4\theta}$$

$$\rho_d = \frac{(n - 1/n)^2 \sin^2\theta}{2 + 2n^2 - (n + 1/n)^2 \sin^2\theta + 4\cos\theta\sqrt{n^2 - \sin^2\theta}}$$

(Equation 3)

Here, n is a refractive index of the object. The zenith angle $\theta$ is obtained by substituting one of $\rho_s$ and $\rho_d$ in Equation 3 for the degree $\rho$ of polarization obtained in Equation 2. A normal vector $(\rho_x, \rho_y, \rho_z)$ is obtained as follows by using the azimuth $\alpha$ and the zenith angle $\theta$ thus obtained.

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix}$$

(Equation 4)

In such a manner, from the relationship between the luminance I expressed by the pixels of the polarized image, and the angle $\theta_{pol}$ of the principal axis of the polarizer, the normal vector of the object projected on the pixels of interest is obtained, and a distribution of normal vectors can be obtained for the entire image. However, since the light observed as described above includes the specular surface reflection component and the diffuse reflection component, for obtaining strictly the normal vector, it is desirable that after the observed light is separated into the specular surface reflection component and the diffuse reflection component, the different reflection models are respectively applied to the specular surface reflection component and the diffuse reflection component. For this reason, heretofore, the research of this component separating method has been advanced.

On the other hand, in the present embodiment, of the normal vectors calculated in Equation 4 for the surface of the object, a portion in which a tendency of the distribution is different from that of others is detected, and a temporal change is detected, thereby specifying an image of a shadow. That is, since this specifying method is based on the spatial or temporal comparison between the calculated normal vectors, it is only necessary that one model of the specular reflection model or the diffuse reflection model is applied without separating the components from each other. Alternatively, even with the degree of polarization obtained from Equation 2, similarly, the image of the shadow is specified.

FIG. 3 is a view of assistance in explaining the principle for specifying the area of the shadow on the basis of the polarization. The figure schematically depicts the shooting space in which a real object 152 and a light source 150 exist. The light from the light source 150 is shielded by the real object 152, so that a shadow 154 is generated on a floor 156. In addition, as indicated by arrows, not only direct light from the light source 150, but also reflected light from other objects such as the floor 156 and a wall 158 are made incident to the real object 152. Then, the imaging apparatus 12 detects light obtained by reflecting the incident light by the real object 152, thereby photographing the image of the real object 152.

The light which is subjected to one or more reflections as compared with the case of the light in the light source 150 is changed in polarization state depending on the material or color of the surface of the object reflecting the light, or the number of times of reflections. In addition, the path of the light leading to the imaging surface depends the position of the light source in the shooting space, or the arrangement or shapes of the various objects existing in the shooting space. Therefore, even in the case of the image of the same real object 152, such a situation of the circumference shall appear as the characteristics in the polarized image. With respect to the floor 156, similarly, the polarization state is different between when there is the shadow 154 and when there is no shadow 154.

Specifically, in the case where there is no shadow 154, that is, the case where the real object 152 does not exist, the reflection of the direct light from the light source 150 becomes dominant. On the other hand, when the shadow 154 is generated due to the presence of the real object 152, since the direct light from the light source 150 does not reach the area of the shadow 154, the component obtained by the further reflection of the reflected light from the wall 158 or the like becomes dominant. Since the direct light from the light source 150, and the reflected light from the wall 158 or the like are different from each other in polarization state, the reflected light from the floor 156 is also changed in polarization state depending on presence or absence of the shadow.

Such a change in polarization state stably appears regardless of an apparent depth or color of the shadow. Then, the change in polarization state is detected on the basis of the change in degree of polarization or distribution of the normal vectors, thereby specifying the area of the shadow, or appearance/disappearance of the area of the shadow. Here, although the polarization state is strictly a ratio of components of light for each vibration direction, it is also possible to consider that the polarization state is the ratio of the diffuse reflection component and the specular reflection component. In the case where as described above, the normal vector is calculated by applying one of the diffuse reflection model and the specular reflection model, the ratio of the diffuse reflection component and the specular reflection component is changed so that the calculated normal vector is changed.

In the example of the figure, when the distribution of the normal vectors to the floor 156, only in a partial area, the normal vector having the different direction is calculated, or when only in a partial area, the degree of polarization is different from that in others, it is possible to specify that there is the shadow 154 in the area of interest. That is, it is possible to decide the presence of the shadow in the spatial change such that in the distribution of the normal vectors exhibiting the uniform or continuous change representing the surface of the object, the normal vector having the peculiar direction exists only in a partial area. Alternatively, it is possible to decide the appearance or disappearance of the shadow in the temporal change such that a part of the distribution of the normal vectors obtained until then was obviously changed at a certain time point. Similarly, even in the case where the degree of polarization is used in the decision, when only in a partial area, the value of the degree of polarization differs, or is changed from the degree of polarization until then, it is possible to decide the presence, the appearance or disappearance of the shadow.

In this method, it is possible to grasp that the change in components of the light is detected via the normal vector which is calculated with the reflection model being fixed. For this reason, "shadow" as the detection target has the meaning wider than the general shadow which the light does not substantially reach and which appears to be black. When the area of such "shadow" is enabled to be extracted, the following effects can be obtained.

(1) In the case where the color of the shadow is deep, it is possible to prevent the false recognition that there is the real object having the deep color.
(2) It is understood that the real object shielding the incident light exists regardless of light and shade of the color of the shadow.
(3) The motion of the light source can be detected regardless of light and shade of the color of the shadow.

(1) described above, for example, is effective in preventing the reduction of the processing accuracy resulting from that up to the motion of the shadow is included in the input information in the information processing with the motion of the real object as the input information. (2) described above offers a peculiar effect that, although even when the real object itself shielding the incident light is not projected on the photographed image, it is possible to detect the existence or penetration to the field of view of the real object. In case as well of (3), even when the light source itself is out of the field of view, the tracking of the position can be performed, and thus the accuracy of the image analysis using the various kinds of reflection models based on the position of the light source ca be enhanced.

Figure 4:
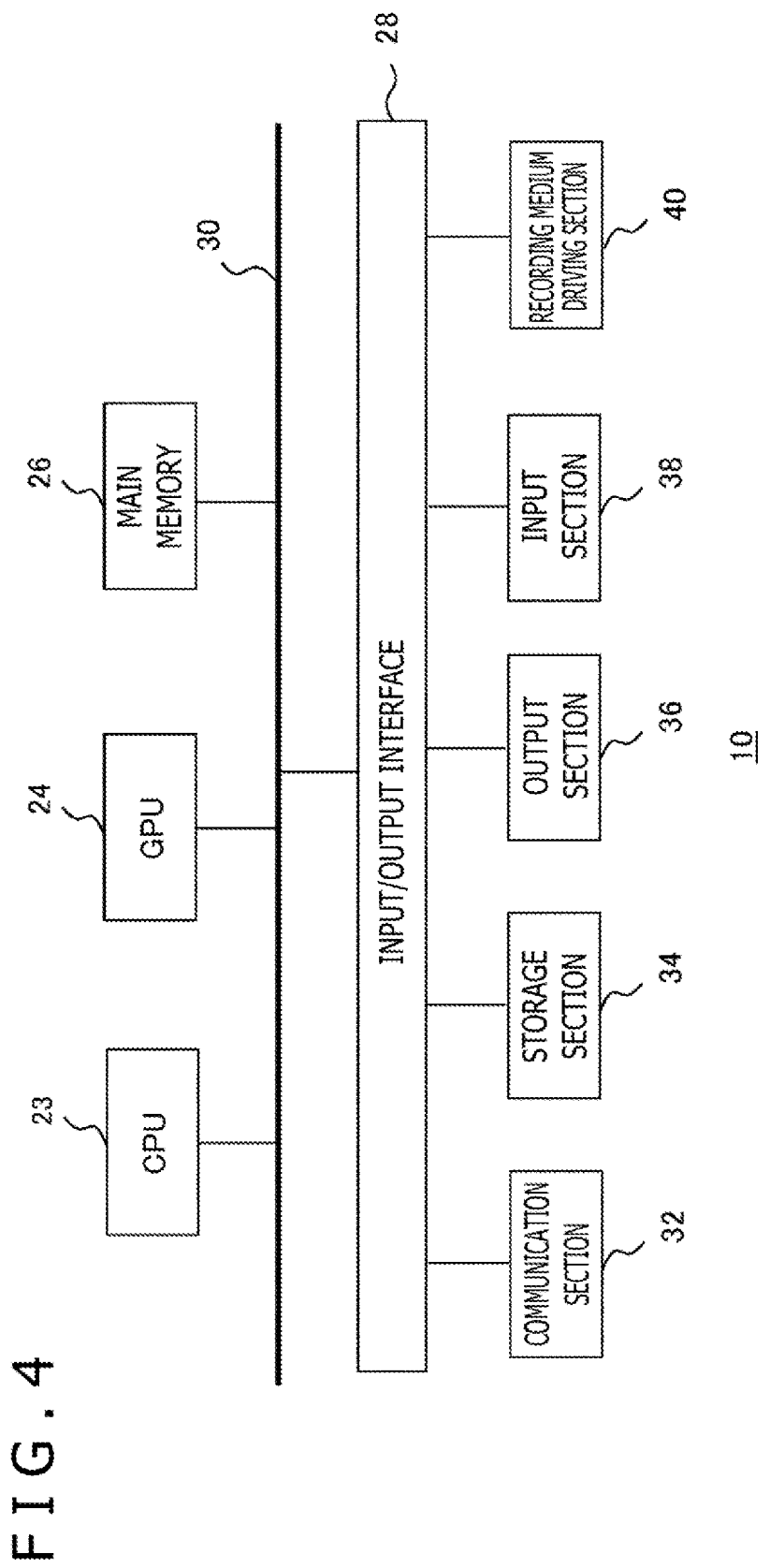
FIG. 4 is a block diagram depicting a configuration of an internal circuit of an information processing apparatus in the embodiment.

FIG. 4 depicts a configuration of an internal circuit of the information processing apparatus 10. The information processing apparatus 10 includes a central processing unit (CPU) 23, a graphics processing unit (GPU) 24, and a main memory 26. The CPU 23, the GPU 24, and the main memory 26 are connected to one another via a bus 30. An input/output interface 28 is also connected to the bus 30. A peripheral apparatus interface such as a universal serial bus (USE) or Institute of Electrical and Electronics Engineers (IEEE) 1394, a communication section 32, a storage section 34, an output section 36, an input section 38, and a recording medium driving section 40 are connected to the input/output, interface 28. In this case, the communication section 32 includes a network interface of a wired or wireless LAN. The storage section 34 includes a hard disc drive, a non-volatile memory or the like. The output section 36 outputs data to the display apparatus 16. The input section 38 receives as input thereof data from the imaging apparatus 12 or an input device (not depicted). In addition, the recording medium driving section 40 drives a removable recording medium such as a magnetic disc, an optical disc, or a semiconductor memory.

The CPU 23 controls the whole of the information processing apparatus 10 by executing an operating system stored in the storage section 34. The CPU 23 also executes various kinds of programs which are read out from the removable recording medium to be loaded into the main memory 26, or downloaded to via the communication section 32. The GPU 24 has a function of a geometry engine and a function of a rendering processor, executes drawing processing in accordance with a drawing instruction issued from the CPU 23 and stores the data associated with the display image in a frame buffer (not depicted). Then, the GPU 24 transforms the display image stored in the frame buffer into a video signal, and outputs the video signal to the output section 36. The main memory 26 includes a random access memory (RAM) and stores therein a program, or data necessary for the processing.

Figure 5:
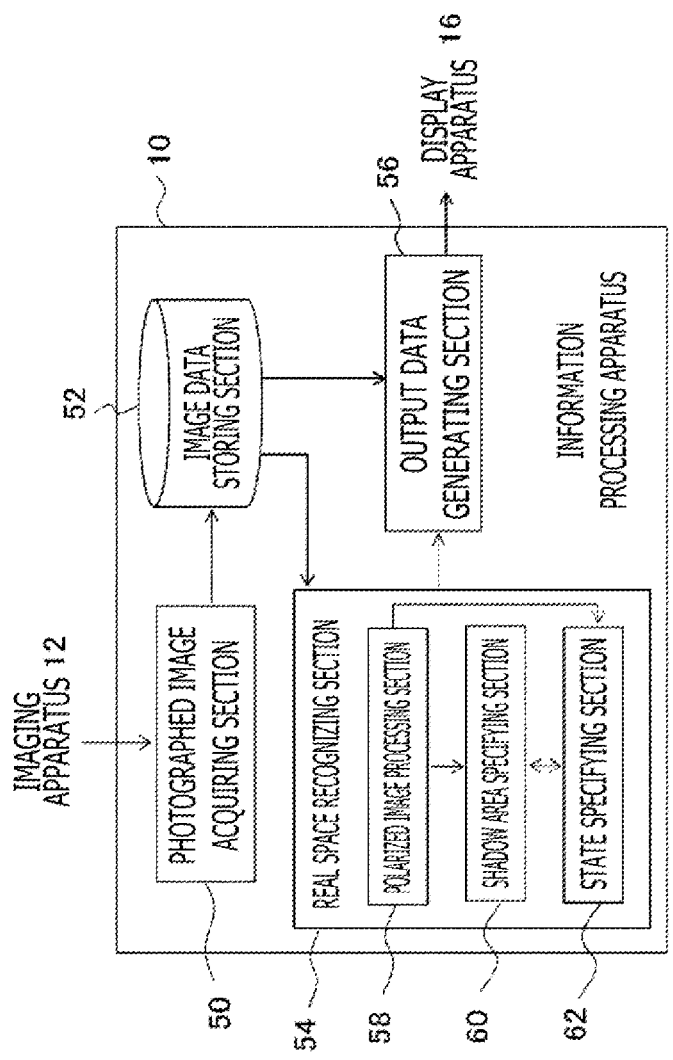
FIG. 5 is a block diagram depicting a configuration of functional blocks of the information processing apparatus in the embodiment.

FIG. 5 depicts a configuration of functional blocks of the information processing apparatus 10 of the present embodiment. The functional blocks depicted in the figure, in terms of hardware, can be realized by a configuration of the CPU 23, the GPU 24, the main memory 26 and the like depicted in FIG. 4, and in terms of software, can be realized by a program exerting various functions such as a data input function, a data holding function, a calculating function, an image processing function, and a communication function which are loaded from the recording medium or the like into the main memory 26. Therefore, it is understood by a person skilled in the art that these functional blocks can be realized in various forms by only the hardware, only the software, or a combination thereof, and the present invention is by no means limited to any of these forms.

The information processing apparatus 10 includes a photographed image acquiring section 50, an image data storing section 52, a real space recognizing section 54, and an output data generating section 56. In this case, the photographed image acquiring section 50 acquires the data associated with the photographed image from the imaging apparatus 12. The image data storing section 52 stores therein the acquired the data associated with the photographed image. The real space recognizing section 54 recognizes the situation of the shadow or the real object in the real space as the photographing target. In addition, the output data generating section 56 generates the data to be outputted such as the display image, and outputs the data of interest.

The photographed image acquiring section 50 is realized by the input section 38, the CPU 23, and the like of FIG. 4, and acquires the data associated with the photographed image including the polarized image at a predetermined rate from the imaging apparatus 12. In the case where the stereo cameras are used as the imaging apparatus 12, one of the stereo cameras may be set as a polarized camera including the imaging element as depicted in FIG. 2, and the other may be set as a camera which photographs an image of general natural light, or both the stereo cameras may be set as the polarized cameras. Alternatively, both the stereo cameras may include the cameras for the natural light, and the polarized camera may be specially provided.

Therefore, the kinds of photographed images which the photographed image acquiring section 50 acquires may be various depending on the configuration of the imaging apparatus 12, or the purpose of the information processing. The image data storing section 52 is realized by the main memory 26, and successively stores therein the data associated with the photographed image which the photographed image acquiring section 50 acquires. At this time, the photographed image acquiring section 50 may generate the luminance image of the natural light from the polarized image by obtaining an average value of the polarized luminance of the four orientations if necessary, and so forth, and may also generate and store the image data necessary for the processing in a subsequent stage.

The real space recognizing section 54 is realized by the CPU 23, the GPU 24 and the like, and acquires the information associated with the real object or the shadow at a predetermined rate by using the data stored in the image data storing section 52. Particularly, the real space recognizing section 54 includes a polarized image processing section 58, a shadow area specifying section 60, and a state specifying section 62. The polarized image processing section 58 obtains the degree of polarization from Equation 2, and the normal vector from Equation 4 each pixel, as described above, from the polarized images of four orientations, or each area including a plurality of pixels.

As described above, in the present embodiment, it is detected that even in the case of the same real object, the components of the light made incident to the imaging surface are different from those of each of other areas, or the components of the light of interest are changed from a certain time point via the degree of polarization or the calculated normal vector. Therefore, when the normal vector is calculated, in the purpose of detecting at least the shadow, if is only necessary that the polarized image processing section 58 applies one of the specular reflection model and the diffuse reflection model. However, for the purpose other than that purpose, the components of the light may be separated or the reflection model may be suitably switched over to another one, thereby specially obtaining the accurate normal vector. After the image of the shadow is specified, with respect to the area of interest, the reflection model may be suitably switched over to the other, thereby obtaining the accurate normal vector.

The shadow area specifying section 60 specifies the area of the image of the shadow by monitoring the distribution of the degrees of polarization or the normal vectors. Specifically, as described above, when the area exhibiting the peculiar degree of polarization or normal vector exists in a part of the distribution of the degrees of polarization or the normal vectors for the surface of the real object, it is decided that there is the shadow in the area of interest. For example, when in the image of the real object, the group of normal vectors each having a difference in direction equal to or larger than a predetermined value with respect to the circumferential normal vectors is obtained in the area having a predetermined area, the area of interest is specified as the image of the shadow.

Alternatively, the group of pixels each having the degree of polarization having a difference equal to or larger than a predetermined threshold value with respect to the circumferential degrees of polarization, the area of interest is specified as the image of the shadow. In addition, the appearance and the disappearance are detected from the appearance and the disappearance of such an abnormal area. Incidentally, all it takes is that a parameter used to specify the area of the shadow is one of the degree of polarization, and the normal vector.

The state specifying section 62 specifies the information associated with the state of the real space on the basis of the distribution of the normal vectors which the polarized image processing section 53 obtains and the area of the shadow which the shadow area specifying section 60 specifies. For example, the posture or shape of the real object is specified from the distribution of normal vectors in the image within the photographed image. At this time, the normal vector in the area of the shadow is excluded from the calculation target, thereby enabling the influence of the false normal vector due to the shadow to be reduced. Alternatively, the state specifying section 62 specifies the presence or position of the real object which generates the shadow of interest on the basis of the generation or position of the shadow. The shadow is specified, resulting in that even when the real object itself is out of the field of view of the photographed image, the real object can be detected.

The position of the light source in the real space is previously acquired, resulting in that the position or motion of the real object which is out of the field of view can be estimated from the positional relationship between the light source of interest and the shadow. In the case where the real object of interest is a thing, such as a controller, the shape or size of which is known, the position or motion of the real object of interest can be more accurately obtained. Further, the state specifying section 62 detects that the position of the light source is changed on the basis of the fact that the real object projected on the photographed image is not changed, while the shadow of the real object is deformed. In this case as well, the position of the light source can be approximately estimated from the position or shape of the real object, and the way of deformation of the shadow.

In the case where the position or motion of the real object or the light source in the real space is obtained in such a manner, the state specifying section 62 calculates the positions of the real object and the shadow in the real space by using the stereo images stored in the image data storing section 52. Specifically, the distance from the imaging surface of the real object or the shadow is obtained on the basis of the principle of the triangulation from the parallax between the images in the stereo images, and the images in the photographed image are reversely projected on the positions corresponding to the distance, thereby obtaining the respective positions in the three-dimensional space. At this time, the position for each micro area of the surface of the real object may be more accurately obtained by using the distribution of the normal vectors which the polarized image processing section 58 acquires.

The position information can be not only utilized in the processing which the output data generating section 56 executes, but also utilized in the detection of the image of the shadow in the shadow area specifying section 60. The shadow area specifying section 60, as described above, specifies the shadow from the peculiarity of the distribution of the degrees of polarization or the normal vectors in the area of the image of the surface of the real object. At this time, the matching is performed with the position information associated with the surface, that is, the information associated with the actual shape and posture, and it is confirmed whether such peculiarity represents the actual state of the surface or is generated due to the shadow, thereby enhancing the accuracy of specifying the image of the shadow. For example, the degree of coincidence between the normal vector which is to be obtained from the actual shape or posture, and the calculated normal vector is evaluated each vector, and the area exhibiting the normal vector for which the degree of coincidence is lower than a threshold value can be specified as the image of the shadow. It should be noted that for the information associated with the actual shape or posture of the real object, the information obtained for the last frame may be utilized. In addition, the information associated with the shape of the real object may be obtained from the shape of the image, or the like in the photographed image.

The output data generating section 56 is realized by the CPU 23, the GPU 24, the output section 36, and the like, and executes predetermined information processing on the basis of the information associated with the state of the real space and specified by the real space recognizing section 54, thereby generating the data to be outputted such as the display image or the sound. As described above, the contents of the information processing which is executed here are by no means especially limited. For example, the image of the virtual world may be drawn in response to the motion of the real object projected on the photographed image, or the data associated with the photographed image may be read out from the image data storing section 52 to draw the virtual object in a superimposition manner so as to respond to the position or posture of the real object.

Alternatively, on the basis of the motion of the real object which is out of the field of view of the photographed image, the processing when the motion of the real object enters the field of view may be speculatively executed, or the motion of the real object which is out of the field of view may also be used as the input value, and the image or the virtual object of the virtual world corresponding to the input value may also be drawn. In an aspect in which the real object is used as the controller which the user grasps, and the game is caused to progress in response to the motion of the controller, even when the controller unintentionally gets out of the field of view of the imaging apparatus, the motion in the meantime can be estimated on the basis of the shadow to continue the game.

Further, in the case where the imaging apparatus 12 is provided in the head-mounted display, the presence of the real object which is out of the field of view may be detected on the basis of the shadow, thereby generating the display image which warns the danger of collision. In addition, the motion itself of the shadow may be used as the input value, and a game in which the motion of the shadow may be used as the input value, and a game in which the motion of the shadow is performed by the user operation, and so forth may be utilized. The output data generating section 56 transmits the output data associated with the display image thus generated or the like to the display apparatus 16 at a predetermined rate.

Figure 6:
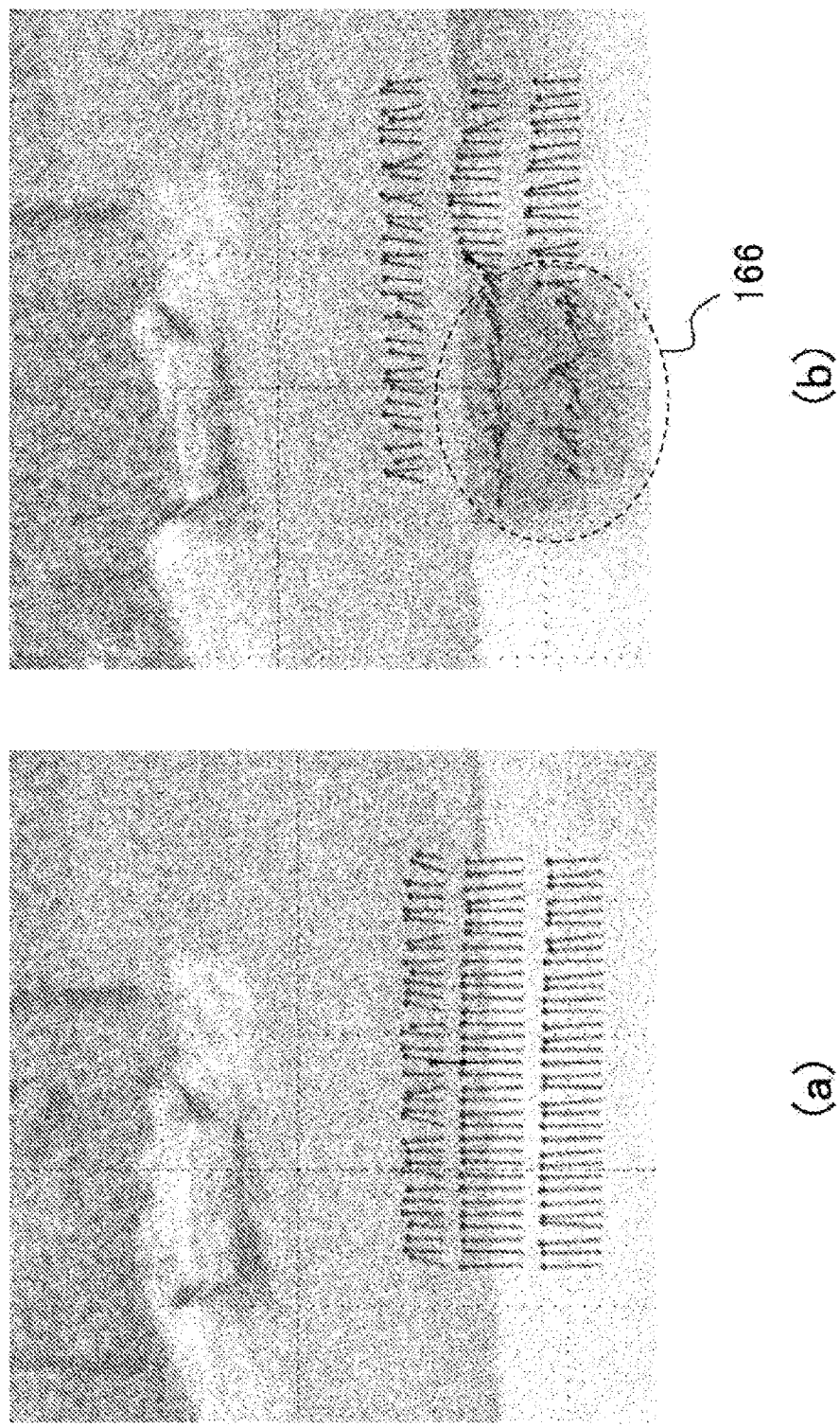
FIG. 6 is a view depicting a situation in which a normal vector calculated with a model being fixed in the embodiment is changed by a shadow by using an actual image.

FIG. 6 depicts a situation in which the normal vector calculated with the model being fixed is changed by the shadow in the form of an actual image. Each of (a) and (b) depicts a normal image when an upper surface of a table is photographed. Here, the normal image is an image in which three elements of the normal vector are used as the pixel values of red-green-blue (RGB), and the image is exhibited by a gray scale. In a lower portion of each of the images, the calculated normal vector is exhibited by an arrow with the pixel of the calculation target as a start point.

(a) depicts the normal images in a state in which there is no shadow on the table, and as indicated by the arrows, the normal images are approximately, uniformly directed upward. Incidentally, the group of normal vectors in the top stage correspond to an area in which a cloth is laid on the table, and the reflection components are changed due to a difference between the materials, and as a result, somewhat change appears in the calculated normal vector, (b) depicts the normal image in a state in which there is the shadow in an area 166 on the table, and the normal vectors are largely changed in the area 166 of interest. This change is remarkable even as compared with the change due to the difference between the materials in (a).

Therefore, the shadow area specifying section 60 calculates the distribution of the normal vectors as depicted in the figure at a predetermined rate and detects that the transition is made from the state (a) to the state (b) on the basis of decision of a threshold value for the difference between both of them, or the like. Then, it is decided that the image of the shadow appears in the area 166 in which the difference exceeding the threshold value is obtained. In addition, when it is detected that the state of (b) is returned back to the state of (a), it is decided that the shadow disappears.

In the light of that the real object is the surface of the table, it is possible to detect that the false normal vector is calculated in the area 166 from only the image of (b) as well, and thus the image of the shadow can be specified. Therefore, the shadow area specifying section 60 may detect the false normal vector on the basis of the various pieces of information associated with the continuity or the like of the image in the position information, object recognition, and photographed image described above, and may specify the area in which the false normal vector is calculated as the image of the shadow.

Figure 7:
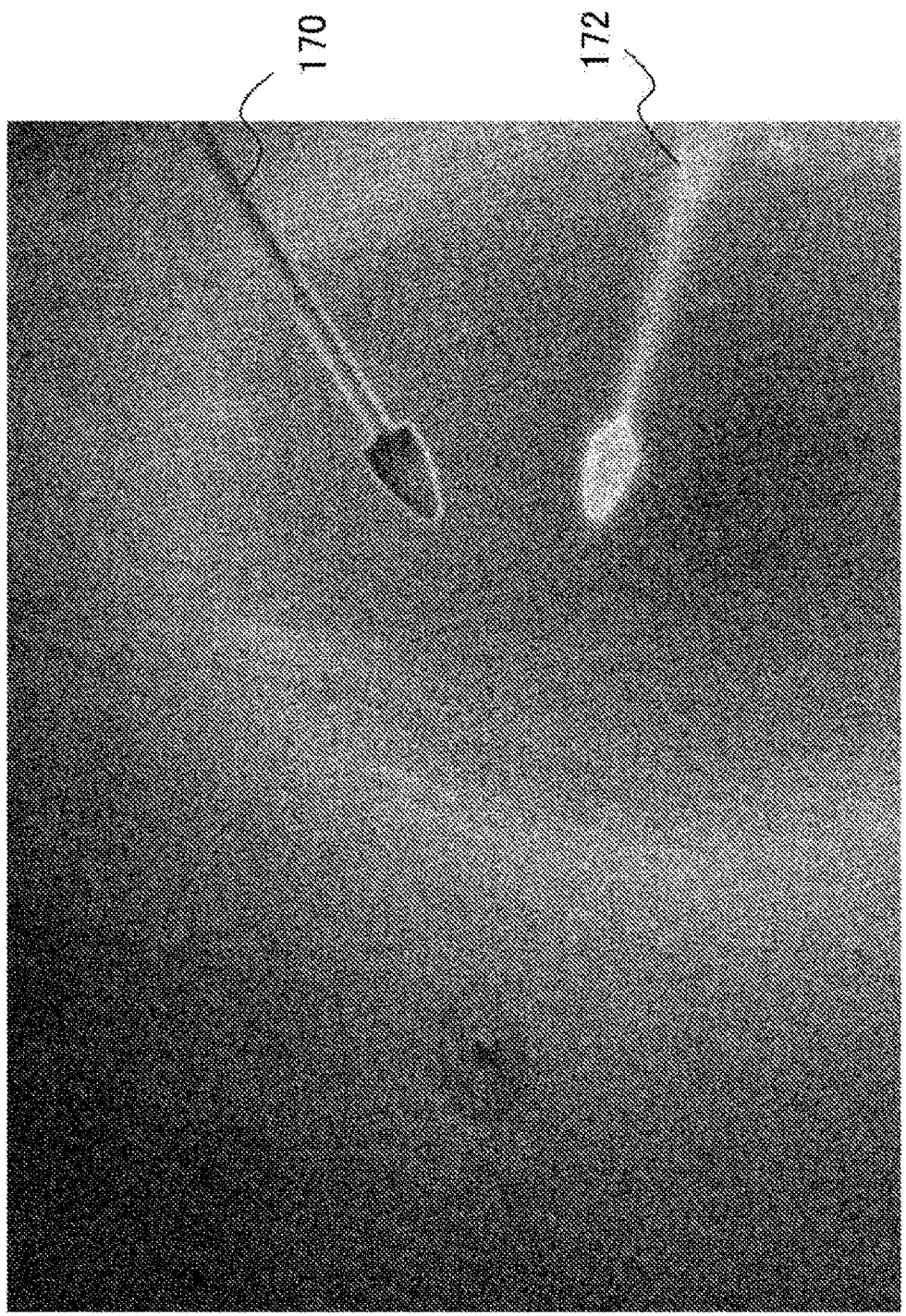
FIG. 7 is a view depicting a situation in which a degree of polarization is changed in the embodiment by a shadow by using an actual image.

FIG. 7 depicts a situation in which the degree of polarization is changed by the shadow in the form of an actual image. The depicted image is a degree-of-polarization image which is generated from the real object and the photographed image of the real object. The degree-of-polarization image is an image in which the degree of polarization obtained from Equation 2 from the luminance of the polarization of four orientations is set as the pixel value. In this example, it is set that as the degree of polarization is higher, the luminance is high. An image 170 of a real object of a pointer, and an image 172 of a shadow which is formed on the table by the real object of the pointer are projected on the degree-of-polarization image.

As depicted in the figure, in the image 172 of the shadow becomes remarkably high as compared with the image 170 of the real object or the image of the upper surface of the table occupying the entire background. This results from that the light from the light source having the low degree of polarization impinges on the real object or the table, whereas even in the same table, the light from the light source does not imping on the area of the shadow. Therefore, an image 172 of the shadow can be specified on the basis of the peculiarity of the partial area with respect to the entire distribution even depending on the degree of polarization. That is, if in the distribution of the degrees of polarization obtained in the image of the table, there is an area having a predetermined area or more and exhibiting the degree of polarization having a difference equal to or larger than a threshold value with respect to that of the circumference, then, this area can be decided as the image 172 of the shadow.

Alternatively, when the real object, and the image of the shadow having the shape similar to that of the real object are detected, the degrees of polarization of both of them are compared with each other and as a result, one having the higher degree of the polarization may be decided as the image 172 of the shadow. For example, in an aspect in which the user operation is performed by the motion of the controller having a known shape, when the image of the controller is detected from the photographed image, the image of the shadow having the similar shape may also be detected in some cases. At this time, the shadow area specifying section 60 compares the degrees of polarization of both of them with each other, and identifies one having the higher degree of polarization as the image of the shadow. From those, it is possible to prevent the image 172 of the shadow from being misunderstood as the image of the real object. In addition, similarly to the case of the decision using the distribution of the normal vectors, when the distribution of the degrees of polarization in the upper surface of the table is monitored, and in a partial area, the degree of polarization is changed so as to be equal to or larger than the predetermined threshold value, it may be decided that the shadow is generated. Alternatively, when in the surface of the same real object in which the degree of polarization should essentially falls within the predetermined range, the degree of polarization departing from the predetermined range is calculated in the partial area, the area of interest may be specified as the shadow.

Figure 8:
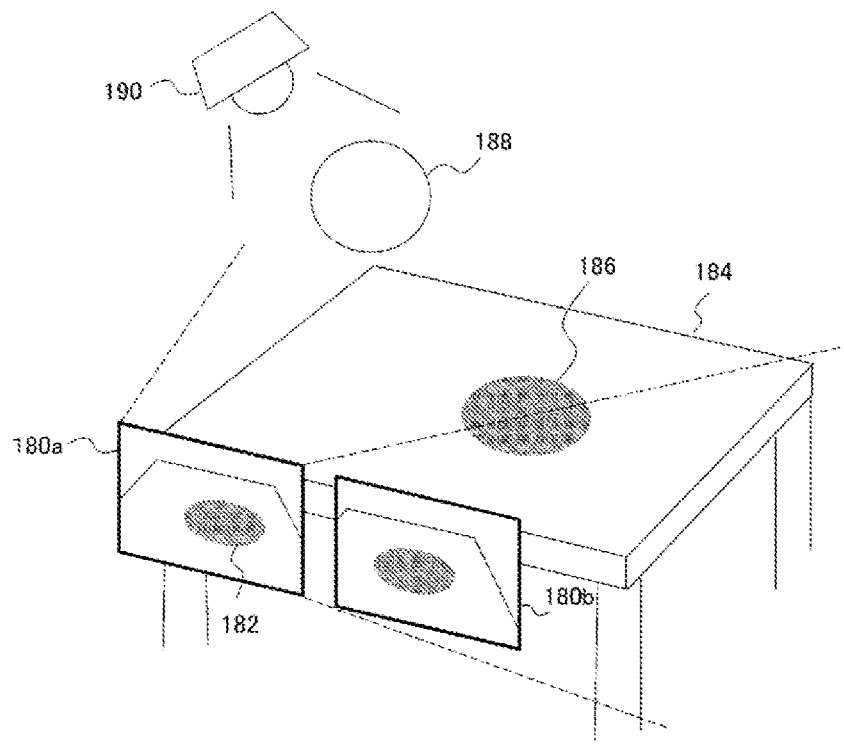
FIG. 8 is a view of assistance in explaining an example of processing in which in the embodiment, a state specifying section acquires state information of a real space from an area of an image of a shadow.

FIG. 8 is a view of assistance in explaining an example of processing in which the state specifying section 62 acquires state information associated with the real space from the area of the image of the shadow. In this example, the real space including a table 184, a ball 188, and a light source 190 is set as the photographing target. However, the ball 188 and the light source 190 are located out of the field of view of the photographed image, and a shadow 186 of the ball 188 is generated on the table 184. For a photographed image 180a obtained by photographing this space, the shadow area specifying section 60, as described above, specifies the image 182 of the shadow.

The image 182 of the shadow is specified in such a manner, resulting in that firstly, the state specifying section 62 can recognize that the shadow 186 is not some sort of real object. Therefore, of the normal vectors calculated for the image on the upper surface of the table 184, the normal vector in the image 182 of the shadow is excluded, thereby enabling the actual direction of the upper surface of the table to be accurately specified. In addition, even when the shadow 186 is moved, it is possible to prevent that the motion is misunderstood as the motion of the real object and the output data generating section 56 is notified of the effect. Further, it is possible to detect that the ball 188 exists out of the field of view of the photographed image.

In the case where the stereo cameras are used as imaging apparatus 12, a photographed image 180b from a point of view having a predetermined interval in a horizontal direction with respect to a point of view of the photographed image 180a is obtained. After the state specifying section 62 acquires a parallax of the images of the shadows in both the photographed images 180a and 180b, thereby obtaining a distance from the imaging surface to the shadow 186, the state specifying section 62 reversely projects the image 182 of the shadow in the photographed image 180a on the three-dimensional space. With respect to the image of the table as well, similarly, the reverse projection is performed, thereby enabling the three-dimensional real space to be reproduced.

When the position of the light source 190 in three-dimensional space is known, the existence range of the ball 188 is approximately specified from a path of the light from the light source 190, and the positions, shapes, and inclinations of the shadow 186 and the table 184. At this time, the calculation used in shadowing processing in the computer graphics can be used. If the shape or size of the ball 188 is known, then, the position of the ball 188 can be more accurately specified. Therefore, the position of the shadow 186 in the three-dimensional space is acquired at a predetermined rate, thereby enabling the motion of the ball 188 to also be specified.

Figure 9:
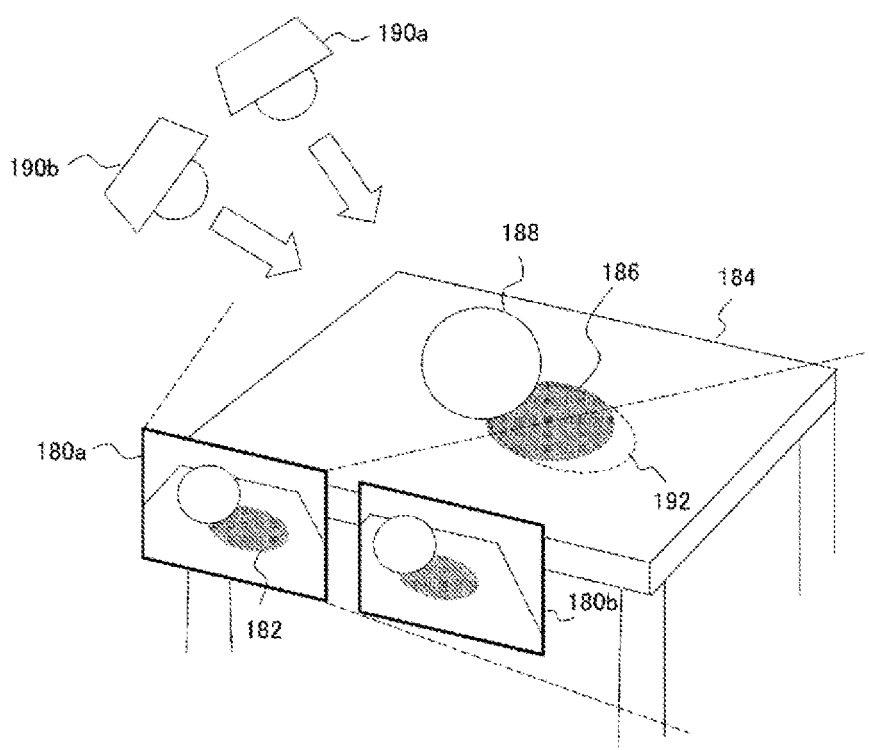
FIG. 9 is a view of assistance in explaining another example of processing in which in the embodiment, the state specifying section acquires the state information of the real space from the area of the image of the shadow.

FIG. 9 is a view of assistance in explaining another example of the processing in which the state specifying section 62 acquires the state information of the real space from the area of the image of the shadow. The photographing target is similar to that of FIG. 8, and the same constituent elements are respectively assigned the same reference numerals. However, in this example, the ball 188 lies within the field of view of the photographed image. In this case as well, the state specifying section 62 acquires the positions in the three-dimensional space of the table 184, the shadow 196, and the ball 188 from the reverse projection from the image in the photographed image 180a. In this case, even if the position of a light, source 190a is unknown, since the position of the ball 188 is known, an optical path which should become such a state and thus the position of the light source 190a can be specified from the positions, the shapes, and the inclinations of the ball 188, the shadow 186, and the table 184.

In the case where there is no change in ball 188, while the range of the shadow 186 is changed like an area 192, the state specifying section 62 can detect that the light source was moved. Actually, the position of the light source is continuously calculated at the predetermined rate on the basis of the positions, the shapes, and the inclinations of the ball 188, the shadow 186, and the table 184, resulting in that the position of a light source 190b when the shadow is formed like the area 192 is naturally made clear. Since in the example depicted in the figure, the range of the shadow extends, it is understood that the light source 190b after the movement is located in a lower position than that of the original light source 190a.

It should be noted that even when the ball 188 is deformed or moved, the position of the light source can be specified by acquiring the information associated with the position or shape of the ball 188. For this reason, the state specifying section 62 may acquire the information of interest by using the known technology such as the object detecting processing or the visual tracking processing for the photographed image, and may specify the position of the light source on the basis of both the information of interest, and the information associated with the shadow. Alternatively, the state information obtained for the last frame of the frames constituting the photographed image may be utilized in specification of the light source position in the current frame.

Figure 10:
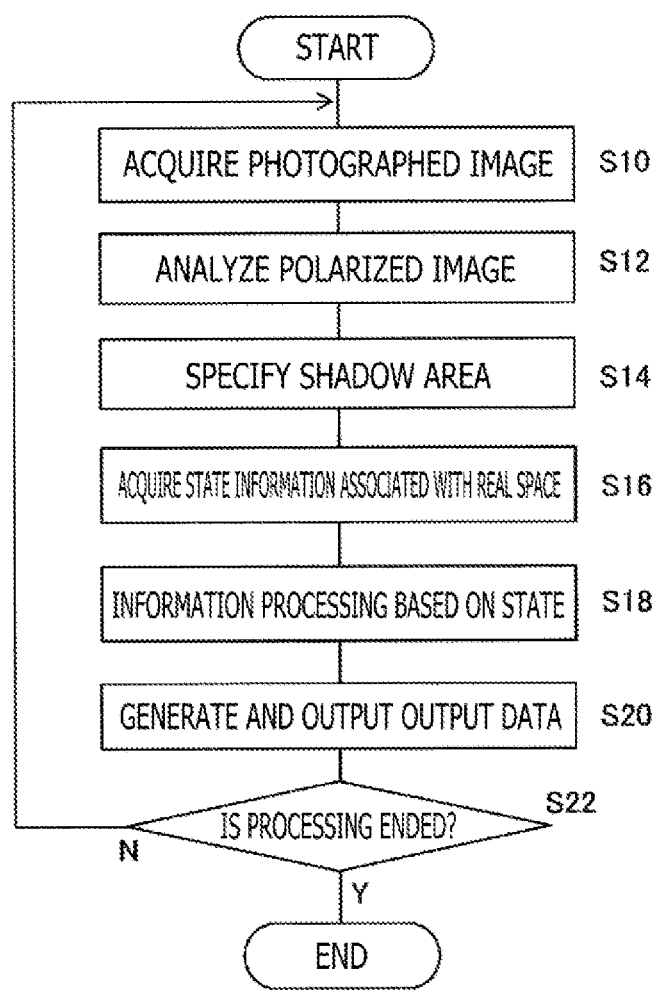
FIG. 10 is a flow chart depicting a processing procedure in which the information processing apparatus of the embodiment recognizes a state of a real space by using a polarized image, and generates and outputs output data on the basis of the recognition result.

Next, a description will be given with respect to the operation of the information processing apparatus which can be realized by the constituent elements described until now. FIG. 10 is a flow chart depicting a processing procedure in which the information processing apparatus 10 of the present embodiment recognizes the state of the real space by using the polarized image, and generates and outputs the output data on the basis of the recognition result. The flow chart is started at a time point at which the user requests for the information processing apparatus 10 to start the processing and in response to the request, the imaging apparatus 12 starts the photographing at the predetermined frame rate.

Firstly, the photographed image acquiring section 50 acquires the frame data associated, with the photographed image from the imaging apparatus 12 (S10). The polarized images having a plurality of orientations are included in the data of interest. Further, for the purpose of acquiring the position or posture of the real object, or being used in generation of the display image, the data associated with other photographed images such as an image of natural light may also be acquired. In addition, in the case where the stereo cameras are used as the imaging apparatus 12, the polarized image or the image of the natural light may be the stereo images.

Next, the polarized image processing section 58 of the real space recognizing section 54 analyzes the polarized images having four orientations to calculate the distribution of the degrees of polarization or normal vectors (S12). The calculation of the degree of polarization or normal vector may be performed in a unit of the pixel or in a unit larger than the unit of the pixel. In addition, for the purpose of specifying the image of the shadow, the reflection model which is applied to the calculation of the distribution of the normal vectors is fixed. The shadow area specifying section 60 specifies the area of the image of the shadow within the image on the basis of the distribution of the degrees of polarization or the distribution of the normal vectors (S14). Specifically, as described above, when it is decided that the peculiar value is obtained in the partial area in the distribution of the degrees of polarization or the normal vectors which are obtained in the images of the surfaces of the real objects, the area of interest, is specified as the image of the shadow.

Subsequently, the state specifying section 62 acquires the information associated with the state of the real space by using the information associated with the image of the shadow specified in at least S14 (S16). For example, the information associated with the posture or shape of the real object is acquired by using the distribution of the true normal vectors, except for the normal vector in the image of the shadow, of the normal vectors obtained in S12. Alternatively, the distance to the real object or the shadow is obtained using the stereo images, thereby obtaining the respective positions in the three-dimensional space. Also, the position of the real object which is out of the field of view or the light source is derived from the position of the shadow.

The output data generating section 56 causes the game to progress or draw the virtual object on the photographing image on the basis of the information associated with the state of the real space, thereby generating the output data associated with the display image or the sound to output the output data to the display apparatus 16 (S20). The processing executed here, as described above, is by no means especially limited. For a period of time for which it is unnecessary to stop the processing by the user operation or the like (N in S22), the pieces of processing of S10 to S20 are repetitively executed for the following frames of the photographed image. As a result, the game picture corresponding to the situation of the real space such as the subject or the shadow, or the result of the information processing is displayed as a moving image. When the necessity for stopping the processing by the user operation or the like is generated, all the pieces of processing are ended (Y in S22).

According to the present embodiment as has been described so far, the distribution of the degrees of polarization or the normal vectors is obtained by using the photographed polarized image, and the area of the image of the shadow in the photographed image on the basis of the spatial or temporal change in distribution. As a result, the distinction between the image of the real object, and the image of the shadow can be stably performed regardless of the apparent color or the light and shade. As a result, in the aspect in which the information processing is executed in response to the state or motion of the normal object, it is possible to prevent that the shadow is misunderstood as the real object to reduce the accuracy of the processing. In addition, in the case where the distribution of the normal vectors is used in order to obtain the state of the real object, since the false normal vector due to the shadow can be extracted, the posture or the phase is obtained by excluding the false normal vector, thereby enabling the processing accuracy to be enhanced.

Further, since such exclusion processing is made the assumption, even if the reflection model used in the calculation of the normal vector is set one of the specular reflection model and the diffuse reflection model, the stable result can be obtained regardless of some shadows. As a result, the accurate information processing from which the influence of the shadow is excluded can be realized by the simple algorithm. In addition, even if the real object is located cut of the field of view of the photographed image, the position or motion of the real object can be specified on the basis of the position or shape of the shadow. As a result, in the game or the like in which the motion of the real object is set as the input information, the freer motion can be permitted.

In addition, since the position of the light source which is out of the field of view can also be similarly specified on the basis of the position or shape of the shadow, the state of the real space can be specified in more detail on the basis of the various reflection models by utilizing the information of interest. Further, the novelty game or the like in which the position or motion of the shadow itself is set as the input data can be realized, and the information processing using the photographed image can be diversified.

The present invention has been described so far on the basis of the present embodiment. It is understood by a person skilled in the art that the embodiment described above is an exemplification, various modified changes can be made in a combination of the constituent elements or processing processes, and such modified changes also fail within the scope of the present invention.

REFERENCE SIGNS LIST

10 Information processing apparatus, 12 Imaging apparatus, 16 Display apparatus, 23 CPU, 24 CPU, 26 Main memory, 50 Photographed image acquiring section, 52 Image data storing section, 54 Real space recognizing section, 56 Output data generating section, 58 Polarized image processing section, 60 Shadow area specifying section, 62 State specifying section.

INDUSTRIAL APPLICABILITY

As set forth hereinabove, the present invention can be utilized in various kinds of information processing apparatuses such as a game apparatus, a mobile terminal, and a personal computer, and a system including the same.

The invention claimed is:

1. An information processing apparatus, comprising:
a polarized image processing section acquiring distributions of degrees of polarization and normal vectors in an image plane by using a photographed polarized image;
a shadow area specifying section specifying an area of an image of a shadow on a basis of the distribution of the degrees of polarization or the normal vectors, the distribution being obtained for an image representing one surface of a subject; and
an output data generating section executing processing based on at least the area of the image of the shadow, and outputting a processing result,
wherein the shadow area specifying section specifies, as the area of the image of the shadow, an area which has a predetermined area or more and has the degree of polarization or the normal vector having a difference, with that of a circumference, larger than a predetermined threshold value in the distribution of the degrees of polarization or the normal vectors obtained for the image representing the one surface of the subject.

2. The information processing apparatus according to claim 1, wherein
the polarized image processing section, when the distribution of the normal vectors is acquired, decides one reflection model and applies the one reflection model.

3. The information processing apparatus according to claim 1, wherein
the polarized image processing section acquires the distribution of the degrees of polarization or the normal vectors for each polarized image acquired at a predetermined frame rate, and
the shadow area specifying section detects generation of the area of the image of the shadow on a basis of a difference of the distribution of the degrees of polarization or the normal vectors with that of a last frame.

4. The information processing apparatus according to claim 1, wherein
the shadow area specifying section acquires information associated with a posture of a surface of the subject, and detects the normal vector which does not reflect the posture, of the distribution of the normal vectors obtained for an image representing the surface of the subject, thereby specifying an area of the image of the shadow on the surface.

5. The information processing apparatus according to claim 1, further comprising:
a state specifying section acquiring information associated with a state of the subject by using the normal vector, except the normal vector obtained for the area of the image of the shadow, of the distribution of the normal vectors obtained for the image representing the one surface of the subject.

6. The information processing apparatus according to claim 1, further comprising:
a state specifying section deriving positions and shapes of the shadow and the subject in a real space by using stereo images obtained through photographing from left and right points of view having a known interval, and specifying a position of a real object which is out of a field of view of the stereo images on a basis of a position of a light source, and a position and a shape of a shadow of the subject in the real space.

7. The information processing apparatus according to claim 1, further comprising:
a state specifying section deriving positions and shapes of the shadow and the subject in a real space by using stereo images obtained through photographing performed from left and right points of view having a known interval, and specifying a position of a light source which is out of a field of view of the stereo images on a basis of positions and shapes of the subject which generates the shadow, and the shadow.

8. The information processing apparatus according to claim 1, wherein
the output data generating section detects presence of a real object which is out of a field of view of the polarized image on a basis of presence of the image of the shadow, and executes information processing corresponding to the presence and outputs a processing result.

9. The information processing apparatus according to claim 1, further comprising:
a state specifying section deriving a position of the shadow in a real space by using stereo images obtained through photographing from left and right points of view having a known interval, wherein the input data generating section executes information processing corresponding to the position of the shadow, and outputs a processing result.

10. An information processing method executed by an information processing apparatus, comprising:
acquiring distributions of degrees of polarization and normal vectors in an image plane by using a photographed polarized image;
specifying an area of an image of a shadow on a basis of the distribution of the degrees of polarization or the normal vectors, the distribution being obtained for an image representing one surface of a subject; and
executing processing based on at least the area of the image of the shadow, and outputting a processing result,
wherein the area of the image of the shadow is specified as an area which has a predetermined area or more and has the degree of polarization or the normal vector having a difference, with that of a circumference, larger than a predetermined threshold value in the distribution of the degrees of polarization or the normal vectors obtained for the image representing the one surface of the subject.

11. A non-transitory computer readable medium having stored thereon a computer program for a computer, comprising:
by a polarized image processing section, acquiring distributions of degrees of polarization and normal vectors in an image plane by using a photographed polarized image;
by a shadow area specifying section, specifying an area of an image of a shadow on a basis of the distribution of the degrees of polarization or the normal vectors, the distribution being obtained for an image representing one surface of a subject; and
by an output data generating section, executing processing based on at least the area of the image of the shadow, and outputting a processing result,
wherein the shadow area specifying section specifies, as the area of the image of the shadow, an area which has a predetermined area or more and has the degree of polarization or the normal vector having a difference, with that of a circumference, larger than a predetermined threshold value in the distribution of the degrees of polarization or the normal vectors obtained for the image representing the one surface of the subject.

* * * * *